June 19, 1956  W. L. MORGAN  2,750,832
ELECTRICALLY CONDUCTING FILTERS AND MIRRORS
Filed June 8, 1951  2 Sheets—Sheet 1

Inventor
Willard L. Morgan
By Nobbe & Swope
Attorneys

United States Patent Office 2,750,832
Patented June 19, 1956

2,750,832

ELECTRICALLY CONDUCTING FILTERS AND MIRRORS

Willard L. Morgan, Pittsburgh, Pa., assignor to Libbey-Owens-Ford Glass Company, Toledo, Ohio, a corporation of Ohio Application June 8, 1951, Serial No. 230,557

7 Claims. (Cl. 88—1)

The present invention relates broadly to a partially transparent and partially reflective unit which may be employed as a mirror or filter or both, and more particularly to electrically conducting mirrors and/or filters.

In general, it is the aim of this invention to provide improved semi-transparent, electrically conducting, beam splitting mirrors and dichroic mirrors having either a high reflection or a low reflection, and having incorporated therein a film or layer of an electrically conducting material of transparent thinness upon which is superimposed a plurality of partially transparent coatings which provide the required reflectivity, said coatings being exceptionally hard, durable, and weather and scratch resistant.

It is also an aim of the invention to provide semi-transparent, electrically conducting, beam splitting mirrors and dichroic mirrors of the above character adaptable for a variety of uses and wherein the electrodes employed for conducting electrical energy to and from the electrically conducting coating are associated with said coating in a novel and improved manner.

Other objects and advantages of the invention will become more apparent from the following description when taken in connection with the accompanying drawings.

Figure 1:
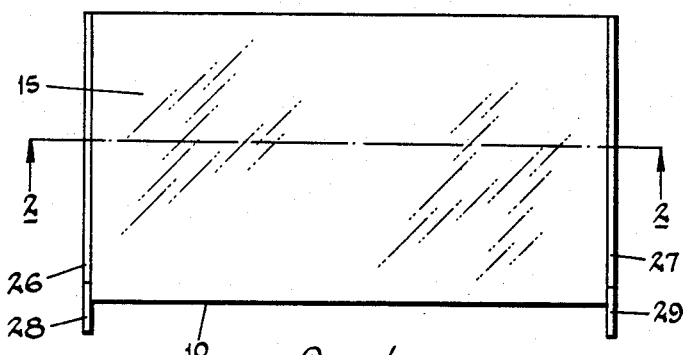
Fig. 1 is a face view of an electrically conducting mirror embodying the present invention.
Figure 2:
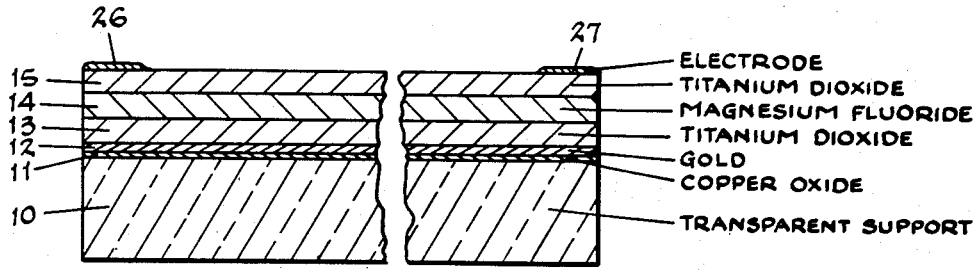
Fig. 2 is a cross-sectional view taken substantially on line 2—2 of Fig. 1.

With reference now to the drawings and particularly to Figs. 1 and 2, there is illustrated one form of mirror embodying the invention and which comprises a support body 10 of transparent glass or plastic carrying upon one surface thereof the five superimposed semi-transparent films or layers 11, 12, 13, 14 and 15. In this mirror, the layer 11 immediately adjacent to the support body 10 consists of a film of metal oxide, preferably gold oxide, copper oxide, aluminum oxide, nickel oxide, or chromium oxide. Upon this film there is formed a thin layer of gold 12 in a transparent thickness, with the metal oxide film acting as an adhesive for bonding the layer of gold to the support body.

Upon the gold layer 12 there is superimposed three partially transparent layers 13, 14 and 15 of differing refractive index. The coatings 13 and 15 are formed of titanium dioxide and the intermediate coating 14 of magnesium fluoride, or the intermediate coating 14 could be of titanium dioxide and the coatings 13 and 15 of magnesium fluoride. The metal oxide film 11 is preferably produced upon the support body by carrying out a glow discharge in a vacuum chamber in an oxygen atmosphere, while the layer of gold 12 and alternate layers 13, 14 and 15 of titanium dioxide and magnesium fluoride are successively deposited upon the metal oxide by thermal evaporation.

The thickness of the metal oxide film 11 and layer of gold 12 may be varied within certain limits while each of the layers 13, 14 and 15 is ordinarily of the order of one-quarter wave length of light and not over nine-quarters of a wave length in individual maximum thickness. Preferably, these layers are each of a one-quarter wave length of light in thickness where the wave length taken for consideration is a wave length in the visible spectrum of light. The wave length chosen for reference to the thickness determination of the individual coatings need not, however, be within the visible spectrum but may be in the infra-red or ultraviolet, and in any case will be the wave length at which the reflective curve or transmission curve shows a maximum or minimum. The alternate layers, while preferably each of one-quarter wave length, need not all be of the same thickness and may be of any other thickness arrangement. Thus, for example, constructions of alternate one-quarter and one-half wave thicknesses of the two substances give excellent dichroic mirrors with desirable optical and electrical properties. Further, a construction of alternate one-quarter wave coats of titanium dioxide and one light wave of magnesium fluoride can be employed.

In accordance with the invention there are provided mirrors including semi-transparent, multiple coats producing light interference phenomena and giving various degrees of light reflection or specular dichroic reflection and transmission, and the number of semi-transparent coatings of titanium dioxide and magnesium fluoride may vary depending upon the use to which the mirror is to be placed. Thus, the particular relative arrangement of the three magnesium fluoride and titanium dioxide coatings in Fig. 2 results in a semi-transparent dichroic mirror of relatively high reflectivity.

Figure 3:
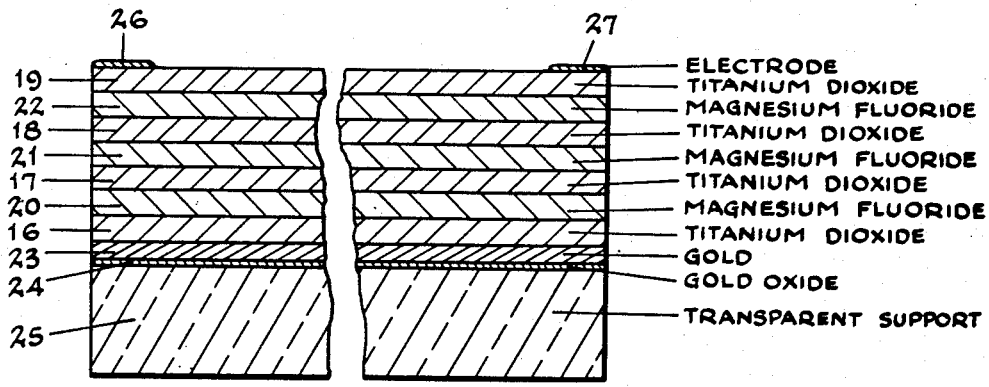
Fig. 3 is a cross-sectional view of another form of mirror.

On the other hand, in Fig. 3 is disclosed a unit including four layers 16, 17, 18 and 19 of titanium dioxide and three layers 20, 21 and 22 of magnesium fluoride arranged alternately relative to one another, with the first layer of titanium dioxide being applied to the layer of gold 23. This unit further distinguishes from the one shown in Fig. 2 in that the adhesive layer 24 between the gold layer 23 and transparent support body 25 consists of a film of gold oxide. However, as pointed out above, copper oxide, aluminum oxide, nickel oxide or chromium oxide may also be used as the adhesive layer. Likewise, if desired, four layers of magnesium fluoride may be used with three layers of titanium dioxide, with the first and final layers being magnesium fluoride. Constructions of over seven layers are also of considerable utility, and products up to fifteen layers have been made. In general, as the number of such coatings increases, the reflective curves show sharper peaks in that certain rays are very easily reflected and adjacent rays only slightly so. Either the magnesium fluoride or the titanium dioxide can be applied as the first layer to the coating of gold depending upon the particular application of the mirror.

By way of illustration, the following examples of four particular forms of mirrors embodying the invention are given:

*Example 1*

Clean glass surfaces were coated in a vacuum chamber with a succession of partially transparent layers to produce a beam splitting mirror having 64% reflection as determined with a Viscor filter upon a photoelectric cell, thus indicating that 64% of visible light was reflected. The product also transmitted 34% visible light so that substantially no light absorption occurred. Further, the product had an electrical resistance of 50 ohms per square and was of a durability closely approximating that of the glass surface since under abrasion tests it was of approximately the same hardness. In salt spray tests it did not show any tendency for the coatings to loosen and the same only became etched at about the same time the glass surface became etched. This beam splitting mirror was substantially colorless by reflection and showed only a slight red purple shade by transmission. The specular reflection and transmission properties thereof are shown in the diagram in Fig. 4.

The product was made by first applying to the glass surface a coating of four molecules thick of copper by thermal deposition of the copper from a tungsten filament in a vacuum chamber. Oxygen was then introduced into the chamber until the vacuum was made poorer to the extent that an electrical glow discharge could be carried out through the rarefied oxygen atmosphere. Under this condition, the oxygen was about one millimeter pressure down to .5 millimeter pressure, and the voltage employed was 15,000 volts. The electrical glow discharge was carried out for a period of five to ten minutes which completely converted the copper layer to a copper oxide layer of similar molecular thickness.

Upon the layer of copper oxide, there was then deposited, by thermal evaporation, a coating of gold which was 40 Angstrom units thick, or approximately eight molecules thick. The gold layer produced was continuous and the combined coatings of gold and copper oxide were of a slight greenish yellow tinge in contrast to the coating that would have been obtained if the gold were applied directly upon the glass. This would have shown light absorption and would be of various diffraction colors ranging through various shades of blue, pink and green.

Without removing the structure thus produced from the vacuum chamber, there was deposited thereon, by thermal evaporation, a coating of titanium dioxide of one-quarter wave length in thickness where the wave length considered in the calculation of the thickness and the weight to produce such thickness was taken as 550 millimicrons or 5500 Angstrom units. This particular wave length is at the center of the maximum visual acuity. Subsequently, a coating of magnesium fluoride of a one-quarter wave length thickness followed by a further coating of titanium dioxide also of one-quarter wave length thickness were deposited upon the first titanium dioxide layer.

Figure 4:
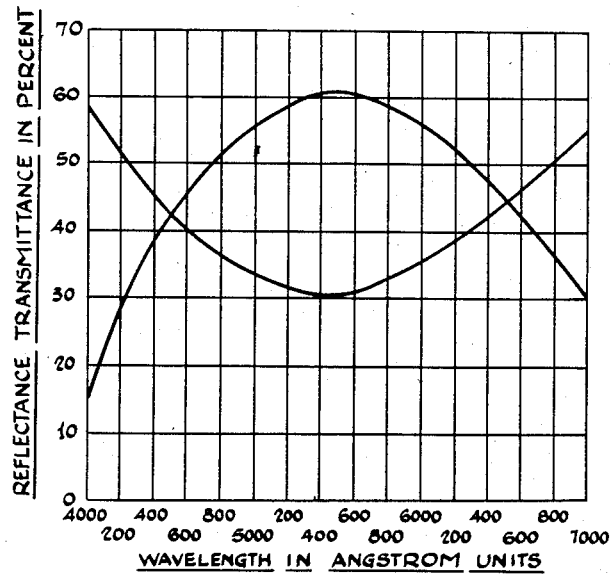
Figs. 4 and 5 are diagrams illustrating reflection and transmission curves of certain examples of mirrors made according to this invention.

By the choice of this particular wave length, a substantially white reflector was produced as shown in the spectral curve in Fig. 4, and it will be seen that the reflection and transmission curves show respectively a maximum and a minimum at this wave length. This beam splitter is of particular use in combination with cathode ray tubes for splitting the picture into two substantially equal intensity images, the transmitted image being 34% of the total and the reflected image being 64% and being then reflected by other mirrors such as an aluminum mirror to present the second image at a desired second location.

*Example 2*

The product here produced consisted of a blue reflecting dichroic mirror having an electrical conductivity of 25 ohms per square and which was particularly useful in reflecting blue light very intensely and ultra-violet light to a high degree while permitting and giving a bright image by transmission in the range in which the eye is most sensitive. Thus, the mirror is useful for splitting light from a source into a reflected beam highly active for photographic work, while at the same time giving an extremely bright transmitted visible image as a second ray. In particular, the product produced had a specular reflection curve and a transmission curve as shown in the diagram in Fig. 5, wherein it will be noted that the reflection curve exceeds 90% in the blue and that the curve shows peaks at 4400 Angstrom units. This particular mirror was found to supply 90% of all photoactive light that it was possible to secure from P-11 phosphor upon an oscilloscope tube, while otherwise giving a very bright visible image by transmission.

In constructing this dichroic blue reflecting beam splitting mirror, there was first provided upon a clean glass surface a thin invisible layer of gold oxide by carrying out a glow discharge in a vacuum chamber from a gold wire in an oxygen atmosphere in a range suitable to glow discharge for a period of ten minutes. Upon this there was then deposited, by thermal evaporation, and in successive order, a layer of gold 60 Angstrom units thick, a one-quarter wave thickness of titanium dioxide, a one-quarter wave thickness of magnesium fluoride, another one-quarter wave thickness of titanium dioxide, another one-quarter wave thickness of magnesium fluoride, a further one-quarter wave thickness of titanium dioxide, a further one-quarter wave thickness of magnesium fluoride, and a final coating of a one-quarter wave thickness of titanium dioxide. Thus, there were applied upon the top of the layer of gold, a multiple coating comprising seven layers—four of titanium dioxide and three of magnesium fluoride. Each of these seven layers was applied as a one-quarter wave thickness based upon the wave length 4400 Angstrom units which, it will be seen, is the wave length at which the peaks occur in the reflection curve in Fig. 5.

*Example 3*

Figure 5:
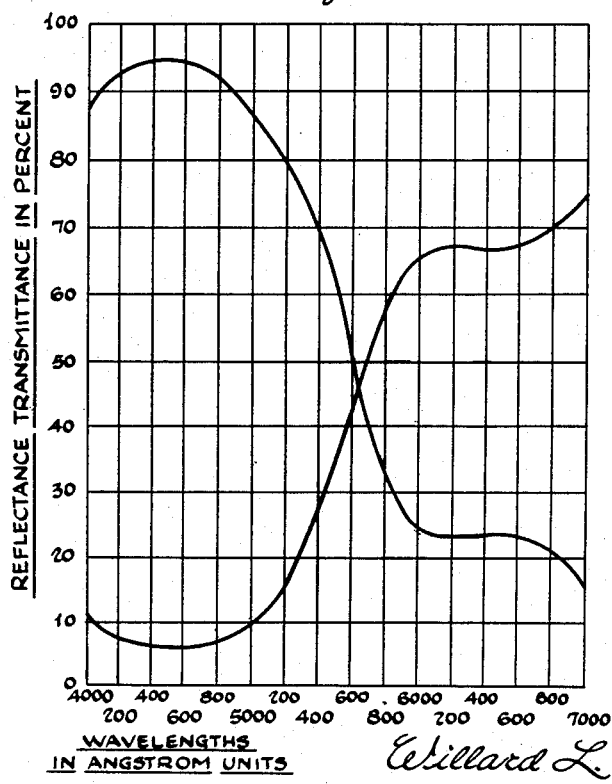

A red reflecting dichroic mirror was produced which showed over 90% reflection at 7200 Angstrom units, which had an electrical conductivity of 8 ohms per square and which had a steepness and sharpness of curve similar to the result generally shown in Fig. 5. This product was made by first thermally evaporating upon clean glass in a vacuum chamber a layer of aluminum oxide which was 25 Angstrom units thick and thus transparent and invisible. Upon this aluminum oxide layer there was deposited a layer of gold of 100 Angstrom units thickness, and upon this gold layer there were then deposited seven layers alternately of titanium dioxide and magnesium fluoride, the first and last layers being titanium dioxide as in Example 2 above. Each of the layers was one-quarter wave length in thickness based upon the red wave 7200 Angstrom units at which ray the reflection curve showed a maximum reflectivity and the transmission curve a minimum.

*Example 4*

A beam splitting mirror having a very high electrical conductivity as shown by an electrical resistance of 2 ohms per square, and having the property of reflecting 90% of the visible light substantially as a white reflector while transmitting 4% of light as a slight red purple was made by first forming upon the glass in the vacuum chamber an adhesive coating of copper oxide in a manner similar to that described in Example 1, and upon this layer of copper oxide there was deposited a layer of gold of 140 Angstrom units thickness. Then upon this gold layer there was formed a mutiple coating of seven layers formed alternately of titanium dioxide and magnesium fluoride, with the first and last layers being titanium dioxide and with each layer of a one-quarter wave length thickness based upon the center of the visible spectrum, namely, 5500 Angstrom units.

In all forms of the invention, including the four specific examples above described, the layer of gold constitutes the electrically conducting coating, and for the purpose of conducting electrical energy to and from said coating there are provided the electrodes 26 and 27. These electrodes may be formed by painting narrow strips of metallic silver in a lacquer base or painting a high content graphite paint along two opposite marginal edges of the unit and in connecting these electrodes by suitable leads 28 and 29 with the source of energy and ground.

Heretofore, it has been customary in the application of electrically conducting coatings to glass to attach the electrodes directly to the layer of electrically conducting material which in this case would be the layer of gold. While it is possible in the present invention to follow this procedure and secure the electrodes to the layer of gold, I have discovered that this is not necessary. Further, that a more desirable and improved unit can be provided by attaching the electrodes to the outer layer of the multiple coat formation as shown in Figs. 2 and 3. This can be done whether the final layer applied be magnesium fluoride or titanium dioxide. I have further discovered that because of the over-all thinness of the multiple coat, there is sufficient leakage of current through the several layers of titanium dioxide and magnesium fluoride to permit the current to pass from the electrodes through said layers to and through the electrical conducting layer of gold. With such an arrangement, it is possible to complete the coating operations in a vacuum chamber without removing the support body therefrom and before applying the electrodes, thereby reducing handling of the glass and the liability of breakage or marring the coated surfaces.

The products produced by the constructions herein shown and described are of particularly wide use and the electrical properties thereof can be employed for the purposes generally of static electricity elimination, for radio frequency shielding, for producing space charges of electricity, and for the purpose of heating the coated glass to prevent fogging by condensation or obscuring by icing when used under atmospheric conditions tending toward condensation or icing. More particularly, the desirable combination of transparency to light with such electrical properties finds uses in mirrors placed in front of oscilloscope tubes for the purpose of projecting a picture from outside of the tube onto the tube face while permitting at the same time direct vision of the tube face by reason of the beam splitting character of the mirror. The electric static elimination accomplished in this case prevents accumulation of dangerous charges upon the glass and of dirt troubles from static accumulation.

In such applications with oscilloscope tubes, it may be desirable to not substantially change the color of the picture being used, in which case an electrically conducting beam splitting mirror which provides a reflected and transmitted beam of substantially no color would be employed. In other applications, where it is desired particularly to photograph the image upon an oscilloscope tube, it is desirable to reflect the blue and ultraviolet selectivity to the camera lens while permitting the operator to see by light transmission through the mirror a picture of what is being photographed. In this instance, an electrically conducting, dichroic mirror is desirable which reflects in the ultraviolet and blue to the extent of over 90%, and transmits the rest of the visible spectrum, particularly the yellow to the eye to an equal 90% efficiency.

In other applications with a cathode ray tube where it is desired to transmit only a part of the spectrum of the phosphor light, a light transmitting, dichroic filter may be employed which is also electrically conducting. For example, the use of a filter which does not transmit any ultraviolet or blue so as to ease the strain upon the operator's eyes by not transmitting such objectionable rays. Conversely, a dichroic electrically conducting filter may also be used in front of the tube to selectively transmit only the ultraviolet and blue so as to take advantage of the short persistence of such parts of the phosphor spectrum and thereby provide instrumentation advantages.

Through the electrically conducting properties of the dichroic filters or beam splitting mirrors, they may be employed in front of the well known fluorescent light sources involving electrical discharge through gases to prevent the radio frequency radiation which is sent out from such light sources from interfering with radio receiving and broadcasting apparatus, while at the same time permitting the visible light to come through to the operators working under the same.

In connection with navigation instruments for airplanes, the electrically conducting beam splitting mirrors of this invention may be employed as a part of an instrument such as in a train of mirrors in a navigation instrument, and such mirrors may be heated directly by passage of electrical current through the same where it is desirable to keep moisture from condensing on the same due to cooling from the upper atmosphere. Likewise, dichroic mirrors may be employed in aerial cameras as filters. In particular, a dichroic mirror transmitting yellow and reflecting blue may be employed in an aerial camera for the purpose of penetrating haze as is well known in the photographic art, and the aerial filter in its exposure to the outside upper air may be heated to protect the same from being obscured either by condensation or by freezing of water thereon. Similar electrically conducting, dichroic filters may be employed specifically for the purpose of transmitting only the red and infra-red or similar aerial infra-red photography.

The production of a beam splitting mirror or dichroic mirror of suitable electrical conductivity and of sufficiently high light transmission to be useful in these applications involved the problem of getting high electrical conductivity through the use of a thin metallic conducting layer while at the same time maintaining transparency and stability in the extremely thin metallic conducting layer as well as further in arriving at a combination in which the reflection and transmission properties and particularly the color properties of the final composite were not adversely affected. It has only been possible to accomplish this through the specific materials employed in the constructions disclosed, and particularly through the use of a thin transparent layer of gold which is secured to the transparent support body by an adhesive film of a metallic oxide. By first coating the glass with the metallic oxide, there is formed a surface upon which gold deposits in a continuous uniform layer rather than as discrete separate spots of gold such as occurs when the gold is directly deposited either upon a glass or plastic surface. The metallic oxide layer is also found to adhere the gold to the glass so that it cannot be wiped or pulled away whereas, in contrast, deposits of gold directly on gold are readily wiped away when in a thin transparent layer.

I have also found that due to the thinness of the gold layer employed, it produces very little light interference effects when a subsequent layer of either magnesium fluoride or titanium dioxide is deposited thereon. Thus, if the gold is made appreciably greater than 150 Angstrom units thick, the reflection effects from such interface begin to enter considerably into and alter the properties which might be expected to be secured through the intereference effects of the successive multiple transparent coatings which are applied to the gold layer, and also the light transmission begins to be seriously affected so that the utility of the filters and mirrors is markedly reduced. On the other hand, it is highly desirable to have a minimum of electrical resistance and in order to secure a stable coating of less than 100 ohms per square resistances, it is necessary that the gold layer be at least 20 Angstrom units thick. When the gold is 100 Angstrom units thick, the electrical conductivity can be of the order of 8 to 10 ohms per square.

It will be appreciated that the electrical resistances given in the foregoing examples and mentioned throughout this specification are given as ohms per square area and that such electrical resistivities are as usual, the reciprocals of electrical conductivity, thus, the lower the electrical resistance the better the electrical conductivity, and if a film has an electrical resistance of 100 ohms per square it has such a resistivity regardless of whether the square is one inch on the side or one foot on the side. In applying the products of the invention to specific applications, the desirability of securing very low electrical resistance or high electrical conductivity becomes emphasized in the choice of voltage at which the electrically heated mirror or filter, etc. must be operated in order to provide such energy. The voltage E required to supply a given amount of energy W to a square of treated glass one square foot in area, when the current is applied to a square of glass, can be determined by the following simple formula in which R is indicated as the electrical resistance.

$$E = \sqrt{WR}$$

Furthermore, within the limits permitted by a specific application, it is of course best to maintain the mirror or filter to a minimum width in one direction since by elongating in the other and attaching the electrodes along the long edges, one secures the advantages similar to having a number of resistances thus connected in parallel.

It is found that with the coated articles of this invention, adhesive tape will not pull the gold or the multiple layers away from the glass because the gold is tightly adhered to the glass by the thin intermediate adhesive layer, and further the multiple layers of magnesium fluoride and titanium dioxide adhere very tightly to each other and to the upper surface of the gold.

In addition to the thermal evaporation and subsequent oxidation, thin layers of metallic oxides may be produced in position upon a glass or other support prior to the subsequent deposition of a gold film thereupon by first applying a thin coating by sputtering a metal in a residual vacuum suitable for sputtering in which the residual vacuum comprises in part oxygen such as from evacuating an air filled vessel. This sputtering may be carried out in means well known in such art employing the metal to be sputtered as an electrode and in some cases where a metallic evacuation chamber is employed, a coating of the metal on the chamber walls may be used as one of the electrodes. The latter is particularly advantageous where A. C. rather than D. C. current is employed. In such cases, the other electrode would preferably also be of the metal desired to be sputtered.

The sputtered metal oxide adhesive layers necessary for use in securing the high adhesion characteristics of our products and necessary for presenting a surface upon which the very thin thermally evaporated metal film layers will deposit as continuous coatings, need be, like any of our other adhesive precoat layers, only a few molecules thick and there need not be any visible coating apparent upon the glasses pretreated by the sputtering process. Provided the metal oxide is formed by a sputtering treatment in a residual air or oxygen atmosphere, the final product will be satisfactory even though the preliminary sputtered coating is completely otherwise unapparent. In other words, the sputtered coating can be in some cases, detectable only by the result it produces; namely, of good adhesion and of presenting an entirely different type of metal deposit on the treated glass.

In forming an electrically conducting article in which the electrical conducting film is so extremely thin, it obviously becomes very necessary that the coating be extremely uniform in thickness as otherwise slight variations in thickness will result in variable electrical conductivity and development of greater heating at points of minimum thickness. Such development of hot spots quickly leads to burning out of such a film. In order to secure the necessary smooth continuous and uniformly thick gold conducting film, I prefer to deposit the same upon the glass which has been precoated with a metallic oxide by depositing the gold film by thermal evaporation. Such a method, when the gold is evaporated from filaments properly spaced and loaded, offers a method of securing extremely uniform thin coatings. Furthermore, the precoating of the glass with the gold or other metal oxide also leads directly to forming the subsequent film deposition in a uniform manner, and without such precoating it would not be possible to secure anything like the necessary uniformity of film thickness due to the tendency of the molecule of gold to gather into groups or clusters on glass which has not been precoated.

The difficulties in obtaining the high degree of uniform thickness required will be appreciated when it is realized that the gold films being employed as the transparent electrical conductors are of a thickness ranging from 5 to approximately 50 molecules thick. The articles made by the methods of this invention readily withstand voltages of 110, 220 and 440 volts without any tendency to break down by hot spotting when the articles are used under cooling conditions. It is apparent that the gold film might be deposited also by other means upon the siliceous support precoated with the metallic compound, such as by chemical deposition, and products resulting from such methods are included within the scope of the present invention; however, I prefer the thermal evaporation method of depositing the gold film.

The partially light transparent articles constructed in accordance with the disclosure herein exhibit very great resistance to separation of the metal film from the support body and a surprising resistance to abrasion, and this is accomplished without in any way detracting from optical properties. In the foregoing, mention has been made of the fact that the adhesive layer is deposited upon a smooth surface of a support body. In this connection, it may be stated that the term "smooth surface" is used in its ordinary sense and need be only sufficiently smooth to prevent visible or optically apparent light diffusion at the surface and sufficiently smooth to insure the avoidance of electrical hot spots by preventing a base upon which the gold film can be formed in a sufficiently uniformly thick layer. However, the present invention contemplates that the specific smoothness of the surface of the support body will be reproduced in the outer surface of the adhesive layer and will also result in interfaces at opposite sides of the adhesive layer between the adhesive layer and the support body and between the adhesive layer and the metal film of substantially the same smoothness as the smoothness of the smooth surface of the support body. Thus, if the smooth surface of the support body is polished to have an extremely smooth finish, this finish will be reproduced in the interfaces between the adhesive layer and the support body, between the adhesive layer and the metal film, and also at the outer surface of the metal film. Accordingly, the present invention results in an article which transmits light in a manner to show no additional visible light diffusion due to the provision of the intermediate bonding layer. If the critical surface or surfaces of the support body are highly polished, both of the interfaces at opposite sides of the adhesive layer will exhibit substantially the same property of smoothness and in addition the outer surfaces of the metal film will exhibit substantially the same property of smoothness.

Since the adhesive layer is deposited on a smooth surface of the support body, and the metal film is deposited on the smooth surface of the adhesive layer without the possibility of intermingling or mechanically interlocking in either case, and since the possibility of chemical reaction between the solid adhesive layer and the solid vitreous siliceous material and the solid metal of the film is eliminated, it is apparent that the extremely effective adhesion obtained is primarily the result of inherent molecular forces of attraction between the materials.

So that there can be no misunderstanding as to the use herein of the term "glassy siliceous material" as a transparent support, I submit below a definition of this term:

The adhesive effects are secured upon silica, silicates, such as mica which contain silica, aluminum silicate or calcium silicate surfaces, and upon the various types of glass which contain different amounts of silica. Thus, with the lead glasses which have 30 to 60 percent silica, with the optical glasses of 50 percent silica or more, the ordinary lime glasses of around 65 to 75 percent silica, and with the borosilicate glasses of as high as 80 percent silica, I secure equally as good results as are found with pure silica.

I claim:

1. In a partially transparent and partially reflective electrically conducting unit, a transparent support body, a transparent electrically conducting layer of gold having a thickness of not more than 150 Angstrom units secured to a surface of said support body, and alternately arranged substantially transparent layers of titanium dioxide and magnesium fluoride applied one upon the other and upon said layer of gold, said layers of titanium dioxide and magnesium fluoride coacting to reflect a portion of the spectrum and to transmit another portion thereof, and said electrically conducting layer of gold serving as an electrical conductor while enabling light rays transmitted by the layers of titanium dioxide and magnesium fluoride to pass therethrough.

2. A partially transparent and partially reflective electrically conducting unit as defined in claim 1, in which spaced electrodes for conducting electrical energy to and from the electrically conducting layer of gold are arranged along a pair of marginal edges of the outermost of said layers of titanium dioxide and magnesium fluoride.

3. A partially transparent and partially reflective electrically conducting unit as defined in claim 1, in which a film of metal oxide is applied to a surface of the support body and on which said electrically conducting layer of gold is applied.

4. In a partially transparent and partially reflective electrically conducting unit, a transparent support body, a substantially transparent film of a metal oxide selected from the group consisting of gold oxide, aluminum oxide, copper oxide, nickel oxide and chromium oxide applied to a surface of the support body, a transparent electrically conducting layer of gold applied to the metal oxide film, and alternately arranged substantially transparent layers of titanium dioxide and magnesium fluoride applied one upon the other and upon said layer of gold, said electrically conducting layer of gold acting to reduce static electricity and fogging effects over said layers of titanium dioxide and magnesium fluoride.

5. A partially transparent and partially reflective electrically conducting unit as defined in claim 4, in which there is provided at least one electrode applied along a marginal edge of the outermost of said layers of titanium dioxide and magnesium fluoride.

6. A partially transparent and partially reflective electrically conducting unit as defined in claim 4, in which the film on the surface of said support body is copper oxide, and said layers of titanium dioxide and magnesium fluoride are arranged in three layers one upon the other and upon said layer of gold, the first and third layers being titanium dioxide.

7. A partially transparent and partially reflective electrically conducting unit as defined in claim 4, in which the metal oxide film is gold oxide and said layers of titanium dioxide and magnesium fluoride are applied in seven alternate layers one upon the other and upon said layer of gold, the layer in contact with the gold layer and the outermost layer being titanium dioxide.

References Cited in the file of this patent

UNITED STATES PATENTS

| | | |
|---|---|---|
| 1,884,665 | Greiner | Oct. 25, 1932 |
| 2,021,661 | Kisfaludy | Nov. 19, 1935 |
| 2,333,534 | Lang | Nov. 2, 1943 |
| 2,346,483 | Goss | Apr. 11, 1944 |
| 2,429,420 | McMaster | Oct. 21, 1947 |
| 2,482,054 | Colbert et al. | Sept. 13, 1949 |
| 2,501,563 | Colbert et al. | Mar. 21, 1950 |
| 2,519,545 | Colbert et al. | Aug. 22, 1950 |
| 2,519,722 | Turner | Aug. 22, 1950 |